(12) United States Patent
Kim et al.

(10) Patent No.: US 7,577,526 B2
(45) Date of Patent: Aug. 18, 2009

(54) METHOD FOR DETERMINING AN INITIAL POSITION IN A NAVIGATION SYSTEM

(75) Inventors: Jin-Won Kim, Gyeonggi-do (KR);
Moon-Pil Hyun, Suwon-si (KR);
Sung-Chul Yang, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 354 days.

(21) Appl. No.: 11/353,460

(22) Filed: Feb. 14, 2006

(65) Prior Publication Data
US 2006/0184324 A1    Aug. 17, 2006

(30) Foreign Application Priority Data
Feb. 16, 2005    (KR) .................... 10-2005-0012732

(51) Int. Cl.
*G01C 21/00* (2006.01)
*G01C 21/26* (2006.01)

(52) U.S. Cl. .................. 701/214; 701/213; 701/216

(58) Field of Classification Search .................. 701/23, 701/26, 213–216; 342/357.02, 357.06, 357.08, 342/357.12, 357.15
See application file for complete search history.

(56) References Cited

U.S. PATENT DOCUMENTS

| | | | |
|---|---|---|---|
| 5,589,836 A | | 12/1996 | Noetzel |
| 5,956,250 A | * | 9/1999 | Gudat et al. .................. 701/26 |
| 6,023,653 A | * | 2/2000 | Ichimura et al. ............. 701/208 |
| 6,198,930 B1 | * | 3/2001 | Schipper ................. 342/357.13 |
| 6,349,119 B1 | * | 2/2002 | Sogabe et al. ................ 375/316 |
| 6,429,815 B1 | * | 8/2002 | Soliman ................. 342/357.15 |
| 6,556,832 B1 | * | 4/2003 | Soliman ................. 342/357.06 |
| 6,788,735 B2 | * | 9/2004 | Kohli et al. .................. 375/150 |
| 7,116,268 B2 | * | 10/2006 | Akano .................... 342/357.02 |
| 2002/0183926 A1 | | 12/2002 | Takahashi |
| 2004/0049341 A1 | * | 3/2004 | Fujiwara ..................... 701/210 |

FOREIGN PATENT DOCUMENTS

| | | |
|---|---|---|
| DE | 10028900 | 12/2001 |
| JP | 64-079679 | 3/1989 |
| JP | 05-072315 | 3/1993 |
| JP | 07-325141 | 12/1995 |
| JP | 2000-205867 | 7/2000 |
| JP | 2000-206222 | 7/2000 |
| JP | 2001-356161 | 12/2001 |
| JP | 2002-058057 | 2/2002 |
| JP | 2002-174528 | 6/2002 |

OTHER PUBLICATIONS

Boberg, Bengt. "Robust Navigation: Allowing other systems to support GPS renders increased robustness and precision." Swedish Journal of Military Technology, #3-4, 2005.*
Takahashi, et al. "An Effective Method to Evaluate Intermittent Blocking on Land Vehicle Satellite Communications." IEEE, 1999.*
Tzaras, et al. "A physical-statistical propagation model for diversity in mobile satellite PSN." IEEE, 1998.*

* cited by examiner

*Primary Examiner*—Jack W. Keith
*Assistant Examiner*—Scott A Hughes
(74) *Attorney, Agent, or Firm*—The Farrell Law Firm, LLP (57) ABSTRACT

A function for identifying a current position of a user and providing information about a route to a desired destination is implemented. A mobile communication terminal with a navigation system accurately determines an initial position using a global positioning system (GPS) satellite constellation and a GPS signal intensity and provides a personal navigation service with an improved accuracy.

8 Claims, 5 Drawing Sheets

METHOD FOR DETERMINING AN INITIAL POSITION IN A NAVIGATION SYSTEM

PRIORITY

This application claims priority under 35 U.S.C. § 119 to an application entitled "Method for Determining an Initial Position in a Navigation System" filed in the Korean Intellectual Property Office on Feb. 16, 2005 and assigned Serial No. 2005-12732, the contents of which are incorporated herein by reference.

BACKGROUND OF THE INVENTION

1. Field of the Invention

The present invention generally relates to a method for determining a position of a mobile communication terminal, and more particularly relates to a method for determining an initial position in a personal navigation system using global positioning system (GPS) satellites to reduce a radio positioning error and to improve positioning accuracy in radio positioning for determining a position of a mobile communication terminal.

2. Description of the Related Art

Conventionally, a navigation system is mounted in a vehicle to determine its position and provide an optimum route to a desired destination. This navigation system conventionally determines a position of a vehicle using a global positioning system (GPS).

Currently, the GPS satellite navigational system includes 24 satellites orbiting the Earth at an altitude of about 20.183 Km. GPS satellite navigation systems determine a position of a GPS receiver at a desired position by computing a time taken to receive radio waves (hereinafter called a GPS signals) transmitted by the GPS which are received by a GPS receiver.

Accordingly, conventional automotive GPS navigation systems include a GPS receiver and a GPS sensor mounted at a predetermined position on a vehicle equipped with the GPS navigation system. These navigation systems determine a vehicle's position by analyzing GPS signals received from four satellites. However, there are various positioning error factors to take into consideration when determining a vehicle's position. These error factors include an ionospheric delay error, a satellite clock error, multipath error, and so on. Specifically, GPS navigation systems compute an arrival time of a radio wave from a satellite to the receiver, and computes a position therefrom. When a GPS signal is interrupted or reflected by an object (e.g., tall building, a roadside tree, etc.) which is typical in a metropolitan area, the GPS signal usually cannot be accurately received, and GPS positioning errors increases.

A positioning error included in the GPS signal is about 5 m. Position error estimation on a two-dimensional plane is performed through a multiplication operation on a GPS signal and a horizontal dilution of precision (HDOP) value computed using a satellite constellation. Conventionally, the HDOP value is 2 to 3 when a high accuracy feature is absent. In this case, a position error in the range of 10 to 15 m can be estimated. The HDOP value may increase to 4 or more when a GPS receiver cannot receive a direct GPS signal transmitted from a satellite (due to an object blocking the GPS signal, etc.) and instead receives GPS signals from other more distant satellites. In this case, the position error increases to a value in the range of 20 to 30 m.

Because vehicles typically travel on mapped roads GPS vehicle navigation systems can match an initial position to a position on a given road by referring to a map database (DB) even though a position error is about 30 m. Because distances between roads can typically exceed 30 m, a GPS position error does not affect an initial position determination. However, in the case of a pedestrian walking on a sidewalk for example, two sidewalks which are adjacent to and located on both sides of a road a personal navigation system (PNS) therefore cannot accurately determine which sidewalk of two sidewalks the person is walking on if the distance between the road centerline and the sidewalk is about 20 m and if a position error is about 30 m.

The above-described example will be described with reference to FIG. 1 which illustrates an example in which an error in the conventional initial position determination occurs due to a GPS positioning error.

The pedestrian is present on the sidewalk 10. An example in which an object 20 (e.g., a tall building, a roadside tree, etc.) is located adjacent to the sidewalk 10 will be described. In this case, the distance between a road centerline 40 and a sidewalk 10 or a sidewalk 60 is conventionally about 20 m.

Figure 1:
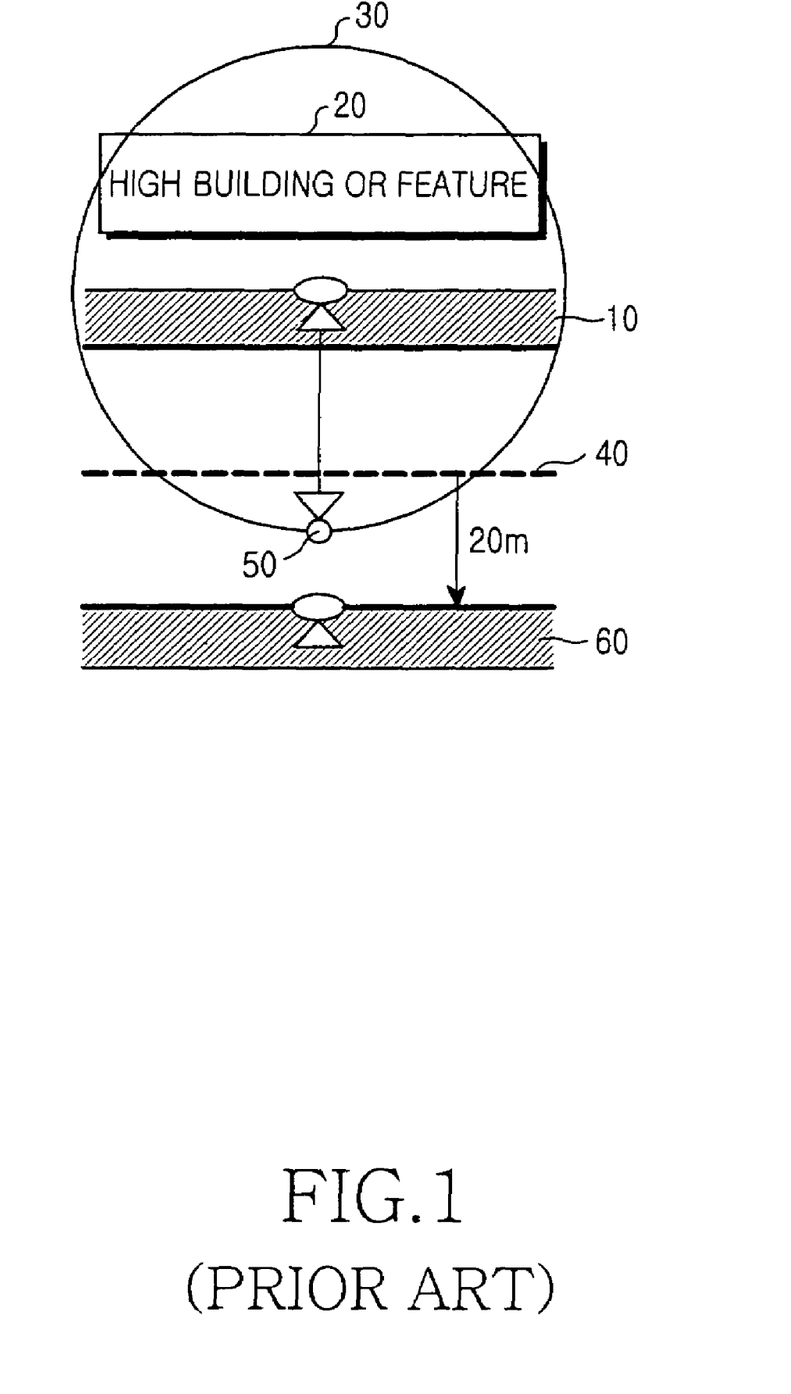
FIG. 1 is a diagram illustrating an example in which an error of an initial position determination occurs due to a global positioning system (GPS) positioning error in a conventional personal navigation system (PNS)

In FIG. 1, if the object 20 (e.g., a tall building, etc.) is located adjacent to the pedestrian when an initial position of the pedestrian is measured, a GPS signal from a satellite may be reflected or diffracted by the feature 20. Accordingly, because the signal is not a direct signal, a position error of a GPS receiver increases. When the position error has a radius of about 30 m or more from the pedestrian, it can be determined that the pedestrian is located at a position as indicated by reference numeral 50. Because the position 50 is present between the road centerline 40 and the sidewalk 60, the position of the pedestrian is actually measured near the sidewalk 60 opposite to the sidewalk 10. The PNS determines that the pedestrian is located on the opposite sidewalk 60, and determines an initial position based on the sidewalks 60 location.

Thus, using a conventional PNS system, when the pedestrian walks on a sidewalk adjacent to a tall building etc.), a position error may occur due to object interference, and a PNS the may erroneously determine that the pedestrian is located on an opposite sidewalk rather than on a target sidewalk when an initial position is determined which can inconvenience the user. When the initial position of the pedestrian is matched to the opposite sidewalk rather than the target sidewalk, a large error occurs in a route guidance function and the quality of route guidance service is degraded.

SUMMARY OF THE INVENTION

It is, therefore, an aspect of the present invention to provide a method that can reduce a positioning error and improve a positioning accuracy when an initial position of a pedestrian is determined.

It is another aspect of the present invention to provide a method that can improve the quality of route guidance service by accurately measuring an initial position using global positioning system (GPS) information in a metropolitan area.

It is yet another aspect of the present invention to provide a method for determining a positioning error due to an obstacle to a radio wave using a satellite constellation and a signal intensity based on global positioning system (GPS) information, and determining an initial position of a pedestrian.

The above and other aspects of the present invention can be achieved by a method for determining an initial position in a navigation system, computing a total number of global positioning system (GPS) satellites using a GPS signal intensity greater than a threshold value, determining a number of GPS satellites of each region of a plurality of regions, from which signals are received, when an area is divided into two regions with respect to a road centerline; and determining an initial position according to a comparison result based on the number of GPS satellites in each region.

BRIEF DESCRIPTION OF THE DRAWINGS

The above and other aspects and advantages of the present invention will be more clearly understood from the following detailed description taken in conjunction with the accompanying drawings, in which.

DETAILED DESCRIPTION OF THE PREFERRED EMBODIMENTS

Preferred embodiments of the present invention will be described in detail herein below with reference to the accompanying drawings. In the drawings, the same or similar elements are denoted by the same reference numerals even though they are depicted in different drawings. In the following description, detailed descriptions of functions and configurations incorporated herein that are well known to those skilled in the art are omitted for clarity and conciseness.

The present invention implements a function for identifying a current position of a user and providing route information for a desired destination. Accordingly, a mobile communication terminal in which a navigation system is mounted in accordance with the present invention accurately determines an initial position using a global positioning system (GPS) satellite constellation and a GPS signal intensity. In accordance with the present invention, a personal navigation service with an improved accuracy can be provided.

The components and operations of a system for providing the personal navigation service in which the above-described function is implemented will be described with reference to FIG. 2 which is a block diagram illustrating a system for providing the personal navigation service in accordance with an embodiment of the present invention.

Figure 2:
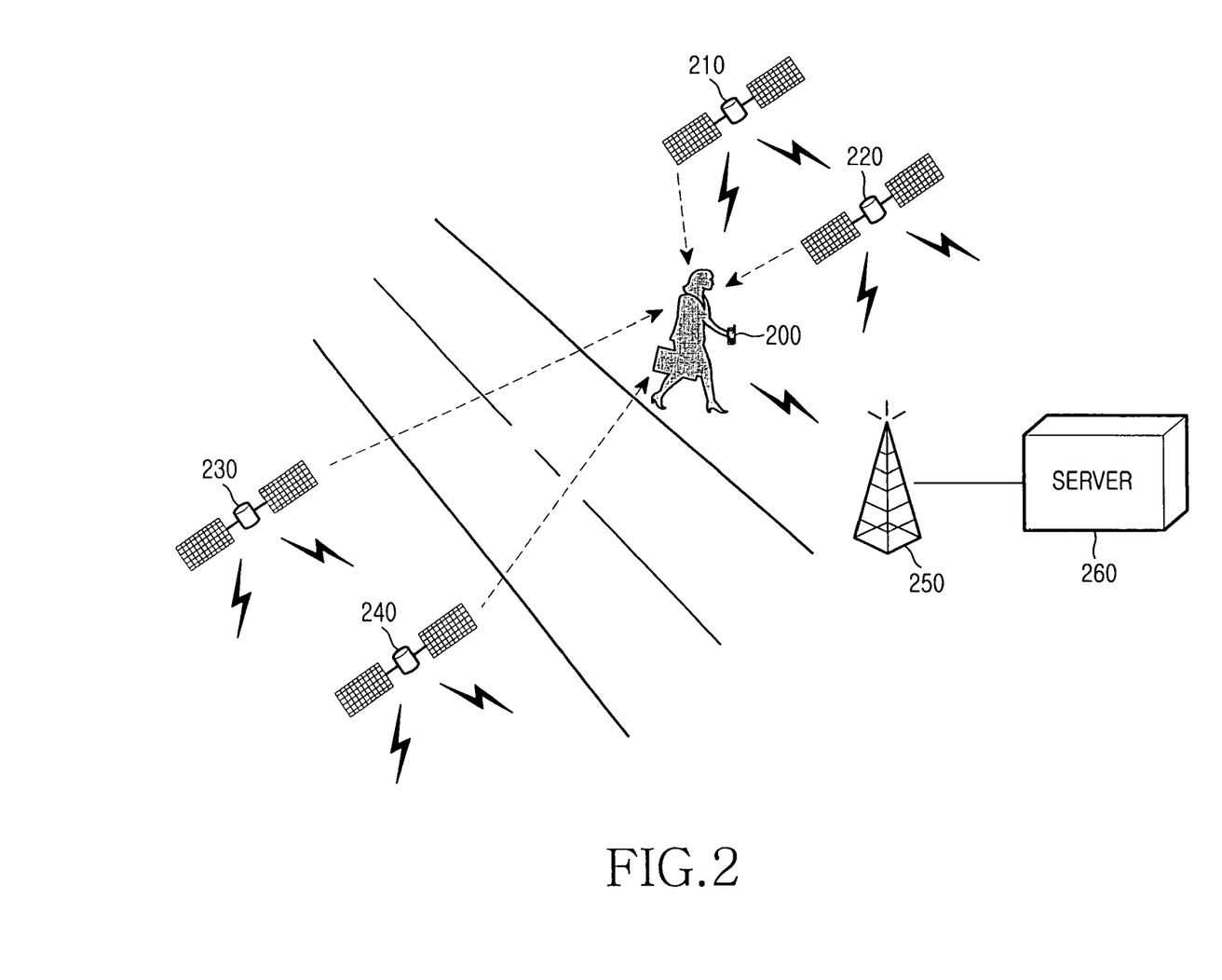
FIG. 2 illustrates a system for providing a personal navigation service in accordance with an embodiment of the present invention.

Referring to FIG. 2, a navigation system for determining a position of a portable personal navigation system (PNS) 200 and providing an optimum route to a desired destination is mounted and used in the PNS 200 carried by user (e.g., a pedestrian). PNS 200 conventionally determines its position using GPS signals received from GPS satellites (e.g., 210, 220, 230 and 240).

Because the portable PNS 200 can receive geographic information from a route guidance server 260 when the pedestrian carries the portable PNS 200, it can display a position of the pedestrian carrying the PNS 200 on a map. The PNS 200 can display a map of an area based on a current position of the PNS 200 and simultaneously providing information about the shortest distance to a desired destination. For this, the PNS 200 includes map data stored therein (or downloaded from an external source) and a GPS receiver (not shown) for measuring a position of the PNS 200. The PNS 200 measures its position using GPS signals received from GPS satellites 210, 220, 230 and 240, and displays, to its user (e.g., the pedestrian), a map of a specific area based on a reference point corresponding to the measured position. Methods for providing a pedestrian route guidance function using the navigation system include storing map data in a memory within the PNS and outputting a map based on a walking route; and a receiving data stored in the route guidance server 260 from a base station 250 wirelessly and outputting the received data.

First, a GPS method used in the present invention will be briefly described.

To determine an initial position in the PNS, the GPS method is widely used. A user may designate and/or determine an initial position on the map using a touch screen or direction key. Alternatively, the user may accurately determine an initial position by inputting information about a main point. A GPS used to receive GPS satellite information and to then compute an absolute position regardless of a region is essential to automatically determine the initial position. However, because the GPS computes a position using an arrival time of a GPS signal from a GPS satellite to the user, the accuracy of the initial position determination is reduced when a signal is interrupted or reflected by an object (e.g. tall building, etc.). Accordingly, a need exists for an algorithm capable of accurately determining which side of the road or sidewalk the user is located on even though the user is located near a tall building or other blocking feature.

Figure 3:
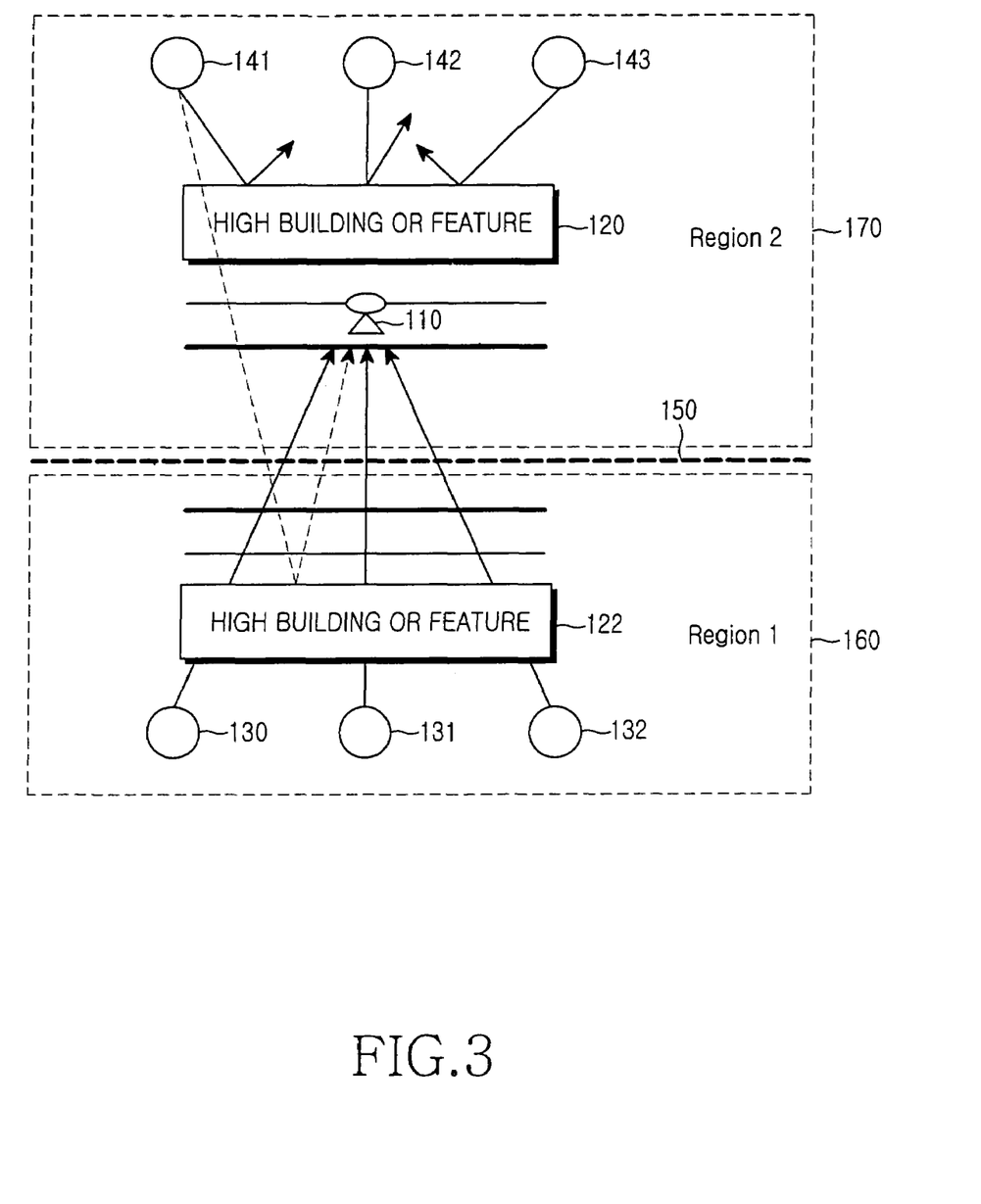
FIG. 3 illustrates an example in which a pedestrian located on a sidewalk adjacent to a tall building receives a GPS signal in accordance with an embodiment of the present invention.

FIG. 3 is a block diagram illustrating an example in which a user located on a sidewalk adjacent to a tall building receives a GPS signal in accordance with an embodiment of the present invention.

When the user carrying a PNS is located on a sidewalk adjacent to an object 120, i.e., a position as indicated by reference numeral 110, as illustrated in FIG. 3, GPS signals from GPS satellites 130, 131 and 132 can be directly transmitted to a GPS receiver of the portable PNS without being blocked by any objects. However, GPS signals from the GPS satellites 141, 142 and 143 are obstructed by the object 120 (i.e. tall building) and only some of the GPS signals are transmitted and the remainder are reflected or otherwise blocked and/or attenuated. Accordingly, all the GPS signals from all of the satellites shown (i.e., 130, 131, 132, 141, 142 and 143) are not received by the PNS. A GPS signal of the GPS satellite 141 is reflected by an opposite object 122 and may be transmitted to the portable PNS. In this case, because the signal intensity is reduced up to 10 dB, the PNS can determine that the GPS signal of the GPS satellite 141 is an obstructed radio wave.

When the user walks on one of the sidewalks located adjacent to a road, an area must be divided on the basis of a road's centerline 150 (or other such locator) such that an initial position of the pedestrian can be determined. In this case, the PNS refers to a map database storing information about the layout of a road to divide an area in which the PNS is located into two regions (i.e., region-1 160 and region-2 170) on the basis of the road's centerline 150. In alternative embodiments, other references can be substituted for the road's centerline.

When the area is divided into region-1 160 and region-2 170 on the basis of the road's centerline 150 through the above-described method, the PNS can divide GPS satellites into two groups according to the regions 160 and 170. The PNS can determine which sidewalk the pedestrian walks on, by comparing the number of GPS satellites of signals received from the region-1 160 with the number of GPS satellites of signals received from region-2 170.

Next, a process for computing the number of GPS satellites associated with each region will be described. The process for computing the number of GPS satellites associated with regions classified on the basis of the road in accordance with an embodiment of the present invention will be described with reference to FIG. 4.

Figure 4:
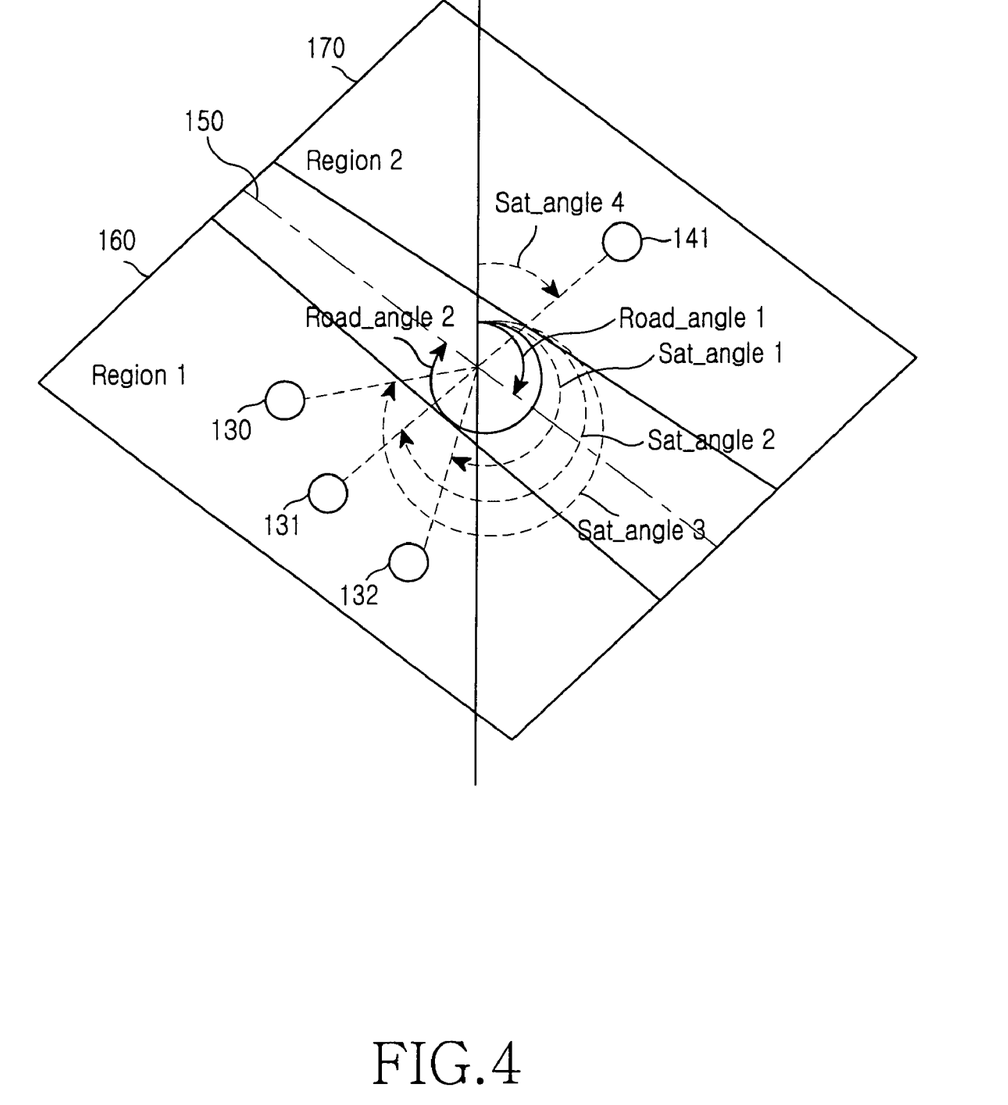
FIG. 4 is a perspective view illustration of a road illustrating a process for computing the number of GPS satellites in regions into which an area is divided on the basis of the road in accordance with an embodiment of the present invention.

First, the number of GPS satellites is computed by selecting associated GPS satellites from which the PNS receives GPS signals of more than a predetermined intensity. Accordingly, the PNS sets a minimum value SNR_min of an intensity (or signal to noise ratio (SNR)) of a GPS satellite signal directly transmitted to the GPS receiver and then detects the GPS signal intensity received from each GPS satellite. The PNS then compares the received GPS signal intensity (or SNR) with the minimum GPS signal intensity SNR_min. The PNS first selects a satellite with the GPS signal intensity (or SNR) greater than the minimum GPS signal intensity SNR_min through a comparison process. Through this process, the PNS can compute the total number of GPS satellites with the signal intensity greater than the minimum GPS signal intensity SNR_min. The total number of GPS satellites from which the PNS receives signals with more than the predetermined intensity is set to N.

For the sake of clarity, it is assumed that the number of GPS satellites 130, 131, 132, and 141 with the signal intensity greater than the minimum GPS signal intensity SNR_min is 4.

A GPS satellite constellation and the PNS's position can be represented on the two-dimensional plane as illustrated in FIG. 4. As illustrated in FIG. 4, a GPS satellites are arranged in each region 160 and 170 as shown. The present invention proposes a method for determining how many GPS satellites are arranged in region-1 160 and region-2 170 into which an area is divided with respect to the road's centerline 150.

A clockwise angle to the road with respect to a predetermined position such as due North (N) on the two-dimensional plane is set to Road_angle 1, and a clockwise angle to an associated GPS satellite with respect to a predetermined position such as due North, i.e., an azimuth angle, is set to Sat_angle such that the number of GPS satellites can be computed for region-1 160. The number of GPS satellites for region-1 160 and region-2 170 can be computed using Equation (1 below.

In Equation (1), N_region 1 denotes the number of satellites for region-1 160, and N_region 2 denotes the number of satellites for region-2 170. Because the total number of GPS satellites N from which the PNS receives signals is already known, N_region 2 is computed by subtracting N_region 1 from the total number of GPS satellites, hence.

(a) $N$_region 1=Number of GPS satellites when Road_angle 1<$Sat$_angle<Road_angle 1+180 degrees; and (b) $N$_region 2=$N$–$N$_region 1     Equation (1)

Referring to FIG. 4, the number of GPS satellites for Region 1 can be computed as follows. In FIG. 4, azimuth angles for GPS satellites 130, 131 and 132 are Sat_angle 1, Sat_angle 2, and Sat_angle 3, respectively, and Road_angle 1+180 degrees=Road_angle 2 at a clockwise angle to the road's centerline 150. Here, The Road_angle 1 is a first angle at the clockwise angle to the road on due north basis.

To determine a region in which the GPS satellite 132 is located, the PNS determines if the azimuth angle Sat_angle 1 for the GPS satellite 132 is present between Road_angle 1 and Road_angle 2. If the azimuth angle Sat_angle 1 for the GPS satellite 132 is greater than Road_angle 1 and less than Road_angle 2, the PNS determines that the GPS satellite 132 is located in Region-1 160. If the azimuth angle Sat_angle 2 for the GPS satellite 1 32 is greater than Road_angle 1 and less than Road_angle 2, the PNS determines that the GPS satellite 132 is located in Region-1 160. Likewise, if the azimuth angle Sat_angle 3 for GPS satellite 130 is greater than Road_angle 1 and less than Road_angle 2, the PNS determines that the GPS satellite 130 is located in region-1 160. When the azimuth angle for the GPS satellite 141 i.e., Sat_angle 4, the azimuth angle Sat_angle 4) is not between Road_angle 1 and Road_angle 2, the PNS determines that the GPS satellite 141 is not located in Region-1 160 and is therefore in another region i.e., region-2 170.

It can be found that the GPS satellites 130, 131 and 132 are located in region-1 160 through the above-described method. When a value of 3 representing the number of GPS satellites in region-1 160 is subtracted from a value of 4 representing the total number of GPS satellites from which the PNS receives signals, the number of GPS satellites in region-2 170 is equal to 1 and hence it is determined that region-1170 has only one satellite (i.e., 140). Accordingly, because N_region 1>N_region 2, it can be determined that a signal received from a satellite in one direction distinguished on the basis of the road is interrupted. A comparison result between the two regions must be used to determine which sidewalk the pedestrian is located on. When the number of satellites in a region with a larger comparison value is at least 3, the initial position is determined. Because N_region 1 and N_region 2 are equal to 3 and 1, respectively, N_region 1>N_region 2. The minimum number of GPS satellites in region-1 is greater than or equal to 3. As a result, it is determined that the initial position of the pedestrian is a sidewalk of region-2 170 with respect to the road. The PNS can provide the user (e.g., pedestrian) with a walking route guidance service.

Another embodiment of the present invention can limit the above-described method to increase an initial position determination probability. When an estimated position error value exceeds the distance between a road's centerline and an adjacent sidewalk after a position error of the user is estimated using the conventional horizontal dilution of precision (HDOP) method, an initial position determination method can be applied using the GPS signal intensity and the GPS satellite constellation. In this case, the distance between the road's centerline and the, sidewalk can be computed on the basis of the number of lanes of the road. The number of lanes of the road is stored in the map database.

Figure 5:
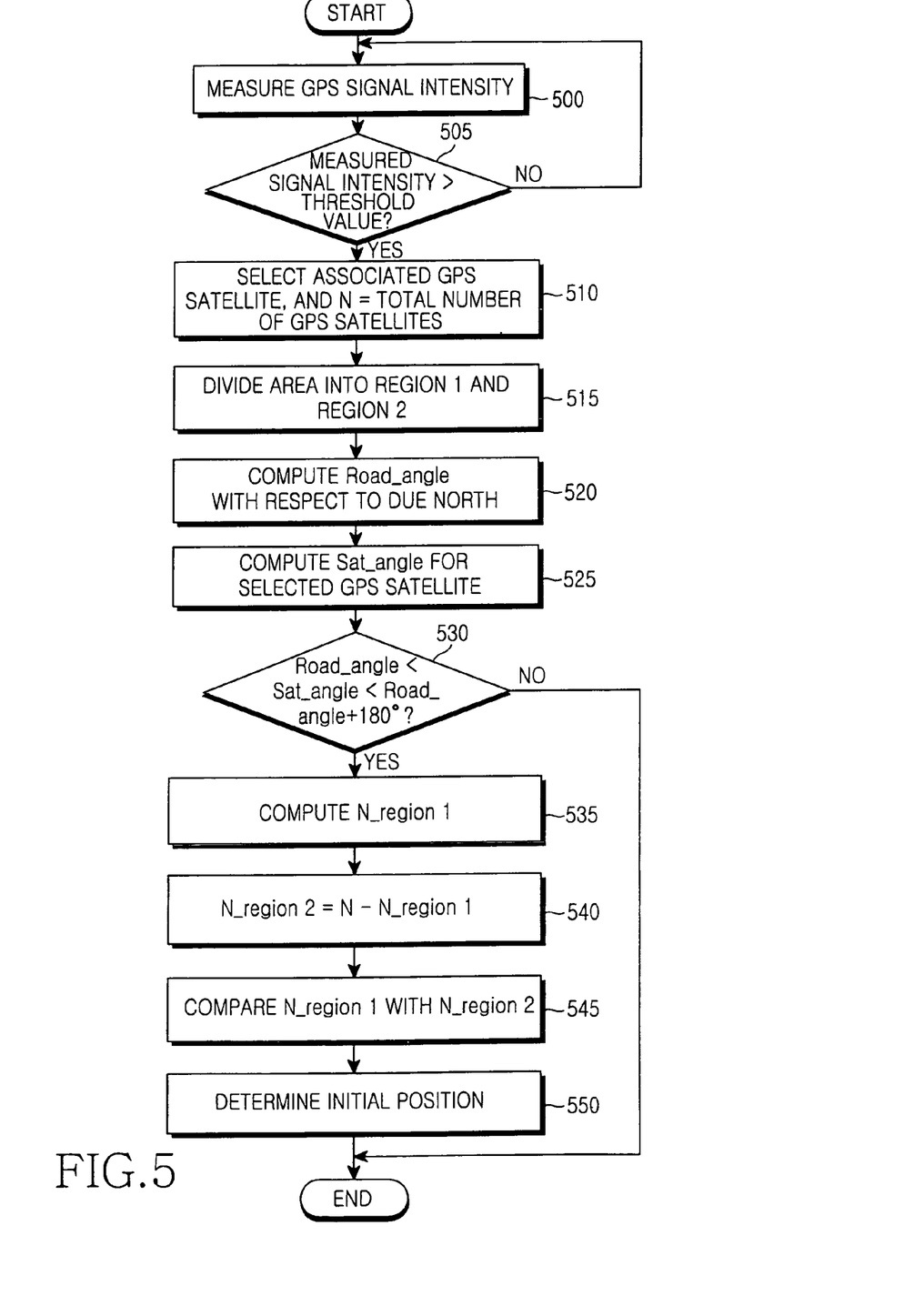
FIG. 5 is a flow chart illustrating a process for determining an initial position of a pedestrian in accordance with an embodiment of the present invention.

Next, the control flow for determining an initial position of the pedestrian in accordance with an embodiment of the present invention will be described with reference to FIG. 5. FIG. 5 is a flow chart illustrating a process for determining an initial position of a pedestrian in accordance with an embodiment of the present invention.

First, the PNS measures a GPS signal intensity in step 500. Then, the PNS proceeds to step 505 to determine if the measured GPS signal intensity is greater than a threshold value representing the minimum signal intensity. If the measured GPS signal intensity is greater than the threshold value, the PNS proceeds to step 510 in which an associated GPS satellite with a GPS signal intensity greater than the threshold value is selected and the total number of satellites from which the PNS receives signals is set to N. The PNS proceeds to step 515 to divide an area into region-1 and region-2 with respect to a road's centerline. In step 520, the PNS computes Road_angle representing an angle to the road with respect to due North (or another preselected position) on a two-dimensional plane. In step 525, the PNS computes an azimuth angle Sat_angle for the selected GPS satellite. In step 530, the PNS determines if an azimuth angle Sat_angle for each GPS satellite is in the range between Road_angle and Road_angle+180 degrees such that the number of GPS satellites is computed for one of the two regions into which the area is divided with respect to the roads centerline. In this case, one region is determined using a road angle, and an angle for the one region is greater than the road angle and less than the (road angle+180 degrees).

If it is determined that a GPS satellite with Sat_angle in the range between Road_angle and Road_angle+180 degrees is located in Region 1, the PNS determines the number of GPS satellites in Region 1 and sets the number of satellites in Region 1 to N_region 1 in step 535. Then, the PNS proceeds to step 540 to compute the number of GPS satellites in Region 2. Because the total number N of GPS satellites from which the PNS receives signals is already known, N_region 2 representing the number of GPS satellites in Region 2 is obtained by subtracting N_region 1 from the total number N of GPS satellites. When N_region 1 and N_region 2 are computed, the PNS proceeds to step 545 to compare N_region 1 with N_region 2. Then, the PNS proceeds to step 550 to determine an initial position according to a comparison result. In more detail, when the number of GPS satellites in one region is greater than that in the other region in the comparison result, it is determined that the user (e.g., the pedestrian) is located on a sidewalk opposite to the region in which the number of GPS satellites is greater. In this case, the greater number of GPS satellites in the associated region must be at least 3.

The present invention provides convenience for a pedestrian by accurately determining an initial position of the pedestrian and performing a route search and walking route guidance. Moreover, the present invention can determine which of the sidewalks adjacent to a given street a pedestrian is located on, using a GPS satellite constellation and a GPS signal intensity. Accordingly, a walking route service can be accurately provided to the pedestrian even when a pedestrian crossing or subway is present on a given route.

Although preferred embodiments of the present invention have been disclosed for illustrative purposes, those skilled in the art will appreciate that various modifications, additions, and substitutions are possible, without departing from the scope of the present invention. Therefore, the present invention is not limited to the above-described embodiments, but is defined by the following claims, along with their full scope of equivalents.

What is claimed is:

1. A method for determining an initial position in a navigation system, comprising the steps of:
    computing a total number of global positioning system (GPS) satellites from which a received GPS signal has intensity greater than a threshold value;
    computing respective numbers of GPS satellites located in each of two regions from the total number of the GPS satellites, wherein the two regions are determined by dividing an area with respect to a road's centerline; and
    determining an initial position of the navigation system according to a comparison result based on the respective numbers of GPS satellites in each of the two regions.

2. The method of claim 1, wherein the step of determining the initial position comprises the steps of:
    comparing values representing the number of GPS satellites in each of the two regions; and
    determining that the initial position is located in the opposite region to the region having a greater value in the comparison result.

3. The method of claim 2, wherein the respective number of GPS satellites computed for the region having the greater value is at least 3.

4. The method of claim 1, wherein the step of computing the respective numbers of GPS satellites comprises the steps of:
    referring to a map database containing the area divided into two regions;
    computing a road angle, which is an to the road, and an azimuth angle to each GPS satellite with respect to due North;
    setting a range for each region using the computed road angle;
    determining if the computed azimuth angle to each GPS satellite is included in the range for a corresponding region; and
    determining that a GPS satellite is located in a given region if the computed azimuth angle for a corresponding GPS satellite is included in the range of a corresponding region for the given region.

5. The method of claim 4, wherein each of the two regions has a range defined by an angle which is greater than the road angle and less than the road angle+180 degrees.

6. The method of claim 4, wherein the step of determining if the computed azimuth angle to each GPS satellite is included in the range for a given region includes determining if the computed azimuth angle of each corresponding GPS satellite is greater than the road angle and less than the road angle+180 degrees.

7. The method of claim 1, further comprising the steps of:
    estimating a position error using a horizontal dilution of precision (HDOP);
    determining if a value of the estimated position error exceeds a distance between the road's centerline and a sidewalk; and
    measuring a received GPS signal intensity if the estimated position error exceeds the distance between the road's centerline and the sidewalk.

8. The method of claim 7, wherein the distance between the roads centerline and the sidewalk is computed on a basis of the number of lanes of the road stored in a map database.

* * * * *

UNITED STATES PATENT AND TRADEMARK OFFICE
CERTIFICATE OF CORRECTION

PATENT NO. : 7,577,526 B2
APPLICATION NO. : 11/353460
DATED : August 18, 2009
INVENTOR(S) : Kim et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 539 days.

Signed and Sealed this

Seventh Day of September, 2010

David J. Kappos
*Director of the United States Patent and Trademark Office*